US006082722A

United States Patent [19]

Cvijanovic

[11] Patent Number: 6,082,722

[45] Date of Patent: Jul. 4, 2000

[54] FIXTURE AND METHOD FOR SUPPORTING AN IRREGULAR WORKPIECE

[76] Inventor: Frank T. Cvijanovic, 30113 Truman Ave., Wickliffe, Ohio 44092

[21] Appl. No.: 09/302,197

[22] Filed: Apr. 29, 1999

[51] Int. Cl.[7] .......... B23Q 3/00

[52] U.S. Cl. .......... 269/287; 269/152; 269/296

[58] Field of Search .......... 269/287, 126, 269/152, 296

[56] References Cited

U.S. PATENT DOCUMENTS

| | | | |
|---|---|---|---|
| 1,983,050 | 12/1934 | Sizer | 269/296 |
| 2,024,112 | 12/1935 | Phillis . | |
| 2,709,384 | 5/1955 | Harris | 269/296 |
| 2,820,644 | 1/1958 | Smith | 269/296 |
| 3,349,647 | 10/1967 | Stan . | |
| 3,400,872 | 9/1968 | Rogers . | |
| 3,837,633 | 9/1974 | Paulsen . | |
| 3,952,936 | 4/1976 | Dearman . | |
| 4,050,685 | 9/1977 | Cox | 269/296 |
| 4,206,911 | 6/1980 | Harrison | 269/296 |
| 4,614,279 | 9/1986 | Toth et al. . | |
| 4,705,468 | 11/1987 | LeBreton . | |
| 5,356,589 | 10/1994 | Sugalski . | |
| 5,556,497 | 9/1996 | Murphy et al. . | |
| 5,568,878 | 10/1996 | LeBreton . | |
| 5,658,456 | 8/1997 | Kenley et al. . | |

*Primary Examiner*—Timothy V. Eley
*Assistant Examiner*—Benjamin M. Halpern
*Attorney, Agent, or Firm*—Renner, Otto, Boisselle & Sklar, L.L.P.

[57] ABSTRACT

A fixture for a workpiece having an irregular shape or an irregular surface which makes the workpiece difficult to consistently locate and support for machining in a conventional device. The fixture includes a base, upon which is mounted a locating member for positioning the workpiece in the fixture, and at least one support assembly. Each support assembly has a plurality of support elements which are independently adjustable as needed to engage the surface of different workpieces to provide support. In operation, the workpiece is placed in the fixture and positioned relative to the locating member. Each support assembly is adjusted as needed, including independently adjusting the support elements to engage the surface of the workpiece, and the support assembly is secured in position. Different workpieces can be quickly, easily, consistently and accurately positioned relative to the fixture with minimal adjustment from one workpiece to the next, while at the same time providing support to those areas of the workpiece subject to a machining operation.

18 Claims, 4 Drawing Sheets

FIXTURE AND METHOD FOR SUPPORTING AN IRREGULAR WORKPIECE

FIELD OF THE INVENTION

The invention described below relates to a fixture for holding a workpiece having an irregular shape or surface for machining, and more particularly, to a fixture for holding an irregular tank for machining.

BACKGROUND OF THE INVENTION

Metal tanks have been used for years to contain a variety of liquids and gases, in devices as diverse as small personal air tanks for underwater exploration, giant tanks mounted on a truck chassis for transporting industrial chemicals, and squat propane tanks for backyard grills. The end use of the tank determines the materials and tolerances used to make the tank.

For applications requiring superior strength-to-weight characteristics, chemical resistance, and predictable stress characteristics in specific directions, these needs may be met with new techniques and materials, some of which are provided by filament-wound, plastic pressure vessels. Generally, these tanks are reinforced with strands of fibers ("roving"), particularly continuous glass fibers, that are pre-impregnated with a suitable thermosetting resin such as polyester or epoxy resin. The roving is wrapped about a mandrel under controlled tension and in a predetermined pattern. The resin-impregnated rovings wound about the mandrel are often referred to as "windings." The mandrel may be a flexible or disposable material that can be removed after the resin in the windings cures. Alternatively, the mandrel may be a permanent part of the finished tank. In the latter arrangement, the mandrel is a liner and may be blow-molded or rotationally cast out of a thermoplastic which is compatible with the thermosetting resin carried by the windings and with the fluid which the finished tank is intended to contain. Thus the liner provides a fluid-tight and chemical-resistant barrier and the windings provide structural reinforcement.

The unique properties of filament-wound pressure vessels (generally referred to as "tanks" hereinafter) lead to their use in a wide variety of applications, such as pressure accumulator tanks in home water systems and in filter tanks for swimming pools and the like. In such applications, it is desirable, and often necessary, to provide access openings in the end walls and/or side wall of the pressure vessel for fittings such as distributor tubes, plumbing connections, or valve connections, for adding chemicals such as water softeners and chlorine to water in the tank before it is used.

In order to provide fluid-tight connections at access openings in the end walls and side wall of the tank, the surfaces around these openings generally undergo a machining operation to flatten and smooth the molded surfaces, and perhaps also to add a groove for holding a seal, such as an o-ring. The tank is generally held in a fixture for the machining operation. Electronically controlled machine tools, including numerically controlled (NC) machines, have allowed industry to perform very precise machining operations in an automated, consistent and repeatable manner. With the increasing precision in machining operations, industry requires fixtures that consistently locate a workpiece in a very precise manner. If the workpiece is slightly out of position in the fixture, the precision of the machining operation is not fully realized.

To support a generally round workpiece for a machining operation, the workpiece is traditionally supported in a fixture, such as a V-block clamp that supports the body of the workpiece. Such traditional fixtures are not suitable for precision machining a filament-wound tank, however. Although the tank has a generally round shape, the windings give the tank an irregular surface and an unpredictable shape. The irregular surface created by the windings often positions the tank off-center in the fixture, such that differences in windings on various tanks place the centers of different tanks in different positions. Every time a different tank is placed in the fixture, the position of the fixture must be carefully readjusted relative to the machining tool. This makes it difficult to automate the process or to consistently maintain tight tolerances as required by industry.

In addition, since a filament-wound tank generally is formed of a plastic material, as a machining tool presses against the tank, the surface of the tank tends to deflect or move away from the machining tool. The interaction between the machining tool and the flexible tank may also create vibration and chatter in the machining tool and/or the tank, thereby further deterring attempts to consistently maintain tight tolerances. As a result, the machining operation must proceed slowly, with repeated passes over the same surface, and the machining tool must be maintained in a particularly sharp condition. Industry needs a fixture which can precisely and repeatedly locate a tank in the fixture for machining and that can support the tank in such a way that the deflection of the tank under a machining tool is minimized.

SUMMARY OF THE INVENTION

The present invention provides a fixture and method which accurately locates a workpiece having an irregular shape or an irregular surface in a fixture and which supports the workpiece adjacent an area to be machined. Accordingly, the present invention allows different workpieces to be accurately located in the fixture without requiring further adjustments to the position of the fixture relative to the machining tool. In addition, the fixture supports the workpiece adjacent the machining area to minimize deflection of the workpiece relative to a machining tool.

According to one aspect of the invention, a fixture for locating and supporting a workpiece having an irregular shape or an irregular surface includes a base, means for locating the workpiece relative to the fixture, and means for supporting the workpiece adjacent an area of the workpiece to undergo a machining operation. The means for supporting and the means for locating are connected to the base.

According to another aspect of the invention, a fixture for locating and supporting a workpiece having an irregular shape or surface includes a base, a locating member which positions the workpiece relative to the fixture, and at least one support assembly connected to the base. The locating member also is connected to the base. The support assembly includes a plurality of independently adjustable support elements which are selectively adjusted to engage the surface of the workpiece to facilitate supporting the workpiece.

According to one embodiment of the invention, the at least one support assembly includes a pair of spaced apart posts and a support member interconnecting the posts, the support member including an opening, the support elements being arranged around the opening.

According to another embodiment of the invention, the support member is movable to facilitate loading and unloading the fixture.

According to one embodiment of the invention, the support member includes a lower member and an upper member which moves between an open position to facilitate loading and unloading the fixture and a closed position whereat the upper member is selectively secured in position.

According to another embodiment of the invention, at least one of the support elements is mounted to the upper member and at least one of the support elements is mounted to the lower member, with at least three support elements total.

According to still another embodiment of the invention, the fixture includes a pair of spaced apart support assemblies.

According to another embodiment of the invention, the locating member is interposed between the pair of support assemblies.

According to yet another embodiment of the invention, the support member has a recessed surface and the support elements extend substantially perpendicular to the recessed surface.

According to yet another aspect of the invention, a fixture for locating and supporting a workpiece having an irregular shape or surface includes a base, a locating member mounted to the base, a plurality of locating elements connected to the base to position the workpiece relative to the base, and a pair of support assemblies mounted to the base and spaced apart on either side of the locating member. Each support assembly includes a pair of laterally spaced apart posts interconnected by a support member. The support member has an opening and a plurality of support elements which are selectively independently axially adjustable to engage the surface of the workpiece. The support assemblies cooperate to support the workpiece therebetween.

According to one embodiment of the invention, the support assemblies and the locating member are in substantially parallel planes which are substantially perpendicular to the base.

According to another aspect of the invention, a method of locating and supporting a workpiece having an irregular shape or surface includes connecting the workpiece to a locating member on a fixture to position the workpiece relative to the fixture, and selectively independently adjusting a plurality of support elements of at least one support assembly connected to the fixture to engage a surface of the workpiece to support to the workpiece.

According to one embodiment of the invention, the method further includes moving an upper member of a support member of the support assembly from a closed position to an open position, loading a workpiece into the fixture, moving the upper member from the open position to the closed position, and securing the upper member in the closed position.

The fixture and method according to the present invention can locate a workpiece at a positioning point and support the workpiece at a location removed from the positioning point. Furthermore, the fixture and method according to the present invention greatly reduces set-up and machining time while improving the ability to precisely and repeatedly locate a tank or other workpiece in the fixture for machining, e.g., cutting, grinding, shaping or otherwise altering the surface of the workpiece. In addition, by supporting the tank in the vicinity of the machining operation, the fixture allows the machining operation to be performed more quickly with fewer passes of the machining tool and less down-time for maintenance.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION

An exemplary embodiment of a fixture and method according to the invention is described below. The fixture locates a workpiece relative to the fixture in a consistent manner that can be readily and accurately repeated, while also supporting the workpiece near an area of the tank to undergo a machining operation.

Figure 1:
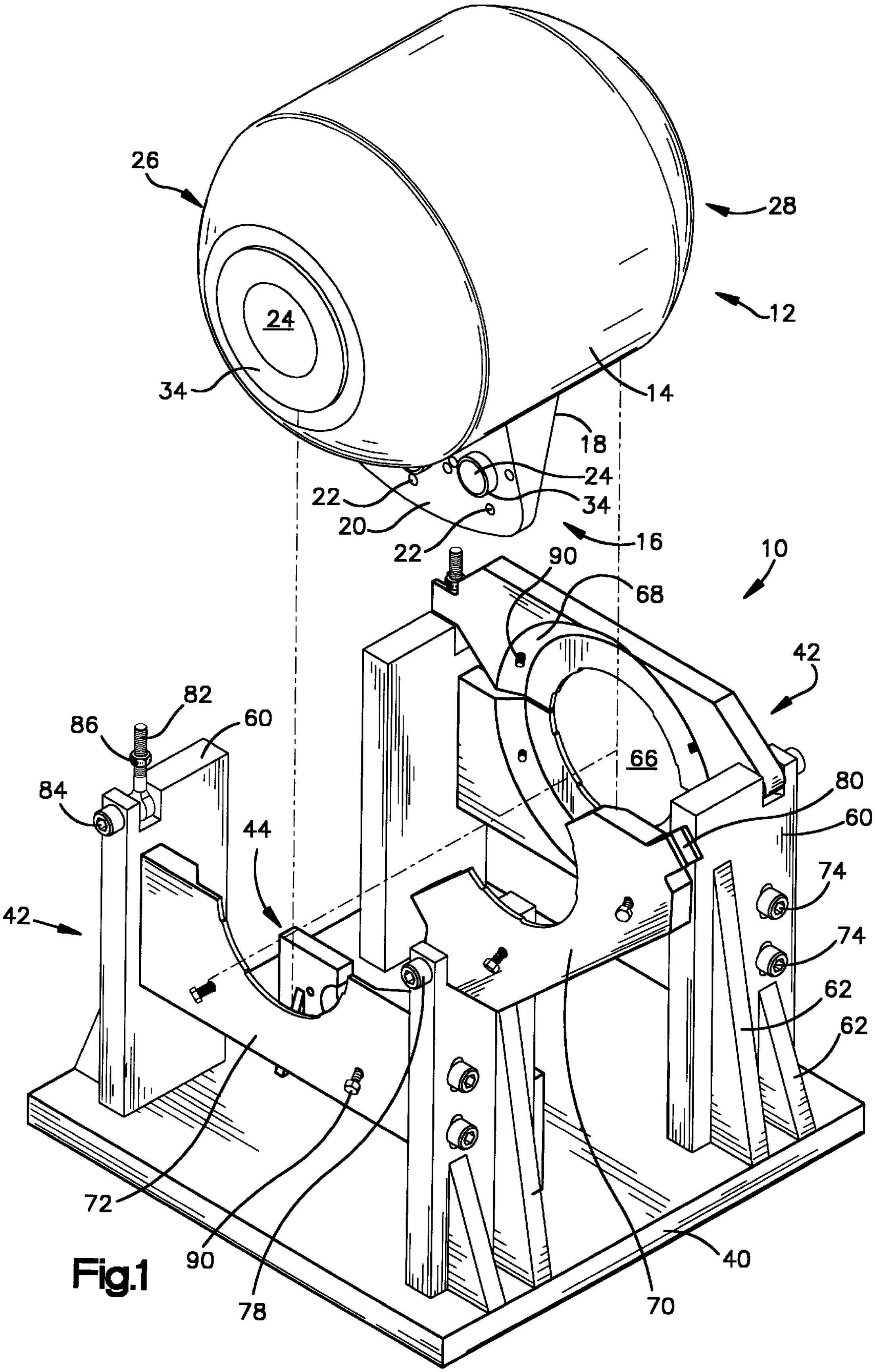
FIG. 1 an exploded perspective view of a tank and a fixture according to the present invention.
Figure 2:
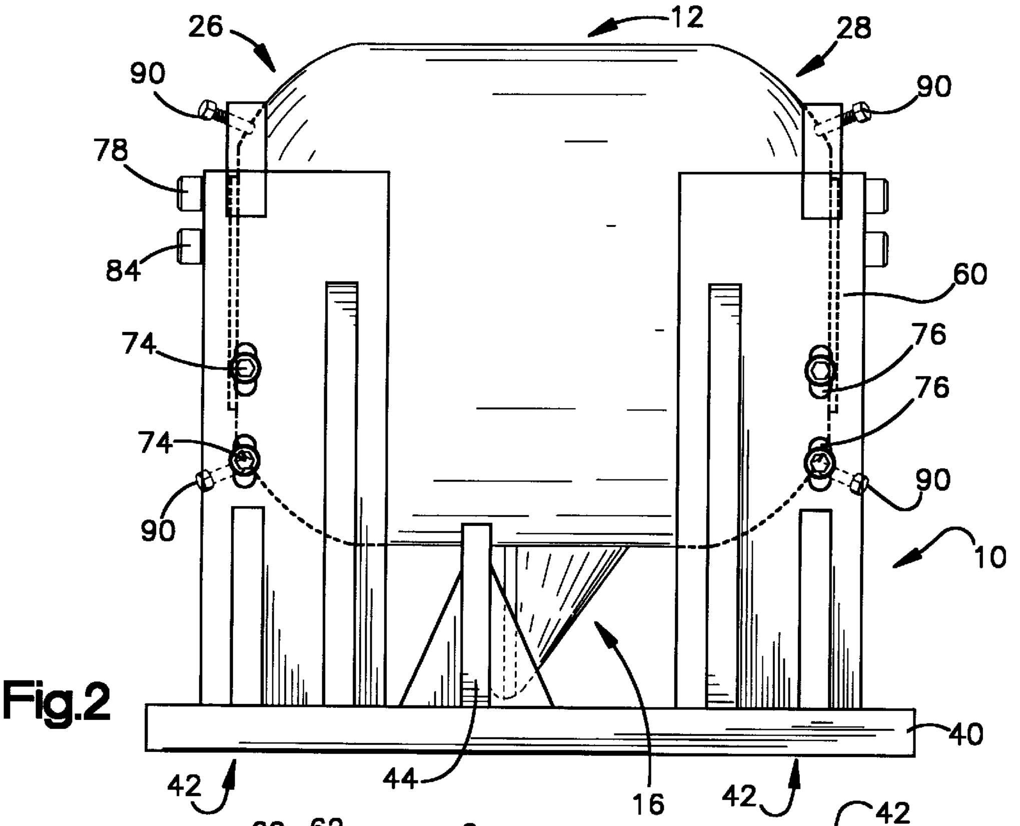
FIG. 2 is a side view of the fixture of FIG. 1, with the tank held in the fixture.
Figure 3:
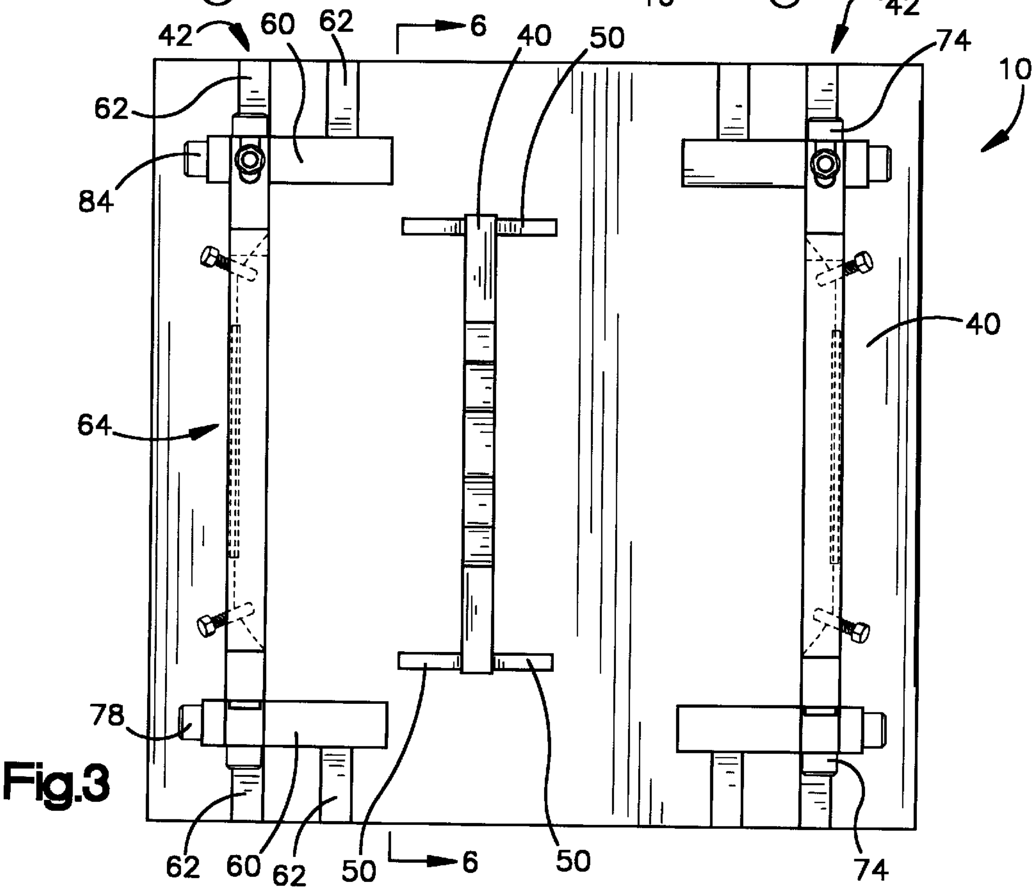
FIG. 3 is a top view of the fixture of FIG. 2.

Referring initially to FIGS. 1–3, the fixture 10 is particularly useful with workpieces having an irregular shape or an irregular surface (hereinafter "irregular" may refer to either the shape or the surface characteristics), including a generally cylindrical filament-wound tank 12, such as the tank produced by Structural North American of Chardon, Ohio, U.S.A. The body 14 of the tank 12 is made of a lightweight, substantially rigid material which generally is not susceptible to expansion or contraction due to pressure, temperature or other environmental condition. For example, the body 14 of the tank 12 may be made from a polypropylene shell reinforced with overlapping layers of fiberglass windings on the outside of the shell. The reinforcing windings significantly improve the stiffness and rigidity of the shell. Other possible reinforcing fibers may be suitable, such as composite fibers, carbon fibers and Kevlar, and may be integrated into the shell body itself or wound on the outside of the shell. Likewise, the shell may be made of other suitable materials, including polyvinylidene fluoride (PVDF). Although the fixture 10 of the present invention is described herein with reference to the illustrated tank 12, the fixture also may be used to support and locate other irregular workpieces for machining operations, which include milling, cutting, grinding, welding, or other material addition or removal processes.

The illustrated tank 12 further has an integral metal platform 16 (or shelf) on a side of the tank body 14. The platform 16 forms a hollow housing having an open side adjacent the tank 12 that is coincident with an opening (not shown) in the side of the tank 12. The platform 16 has an angled bottom side 18 and a top side 20 which has a plurality of locating points formed by blind holes 22, and at least one access opening 24 (see FIG. 4) extending through the top side 20 of the platform 16. The platform 16 also has a plurality of access openings 24. The access openings 24 and interior of the platform 16 provide a pathway for the introduction of materials into the interior of the tank 12, and the angled bottom side 18 of the platform 16 encourages the materials to drain toward the tank 12. Material also may be added through one or more access openings 24 in an upper end 26 and a lower end 28 of the tank 12.

The access openings 24 in the tank 12 must meet precise tolerances for connection to inlet and outlet fittings (not shown). In addition, smooth and flat sealing surfaces 34, and often grooves for o-ring seals, generally are formed about the access openings 24 for fluid-tight connections.

In the illustrated embodiment, the fixture 10 according to the present invention includes a base 40, a pair of support assemblies 42 and a locating member 44. In the preferred embodiment, the support assemblies 42 and locating member 44 are mounted in three generally parallel planes which are generally perpendicular to the base 40, although other arrangements may be preferred for different workpieces. The base 40 may be mounted on a pallet or other mounting device, or simply may be clamped in position relative to a machining tool (not shown).

Figure 4:
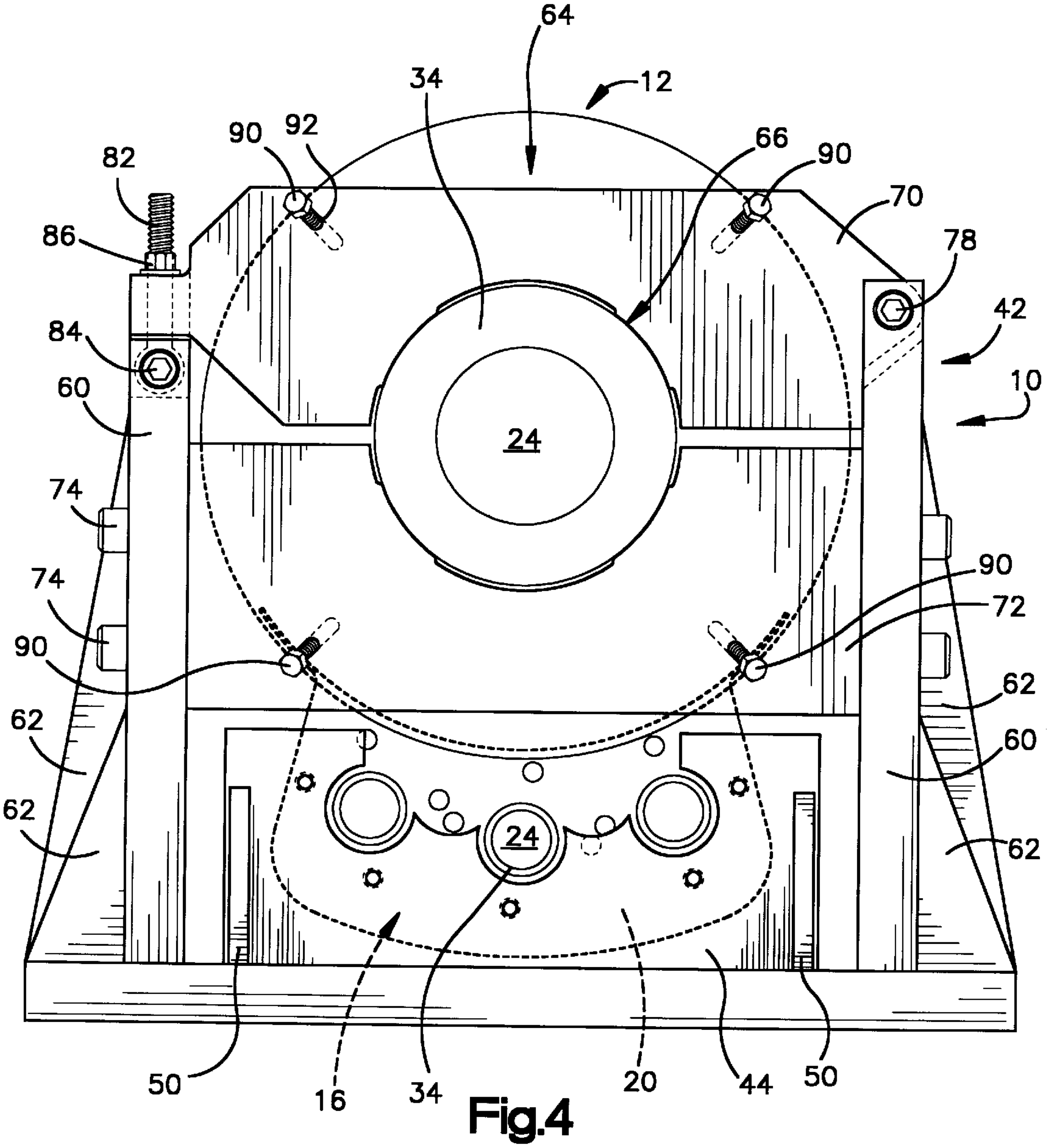
FIG. 4 is a front view of the fixture and the tank shown in FIG. 2.
Figure 6:
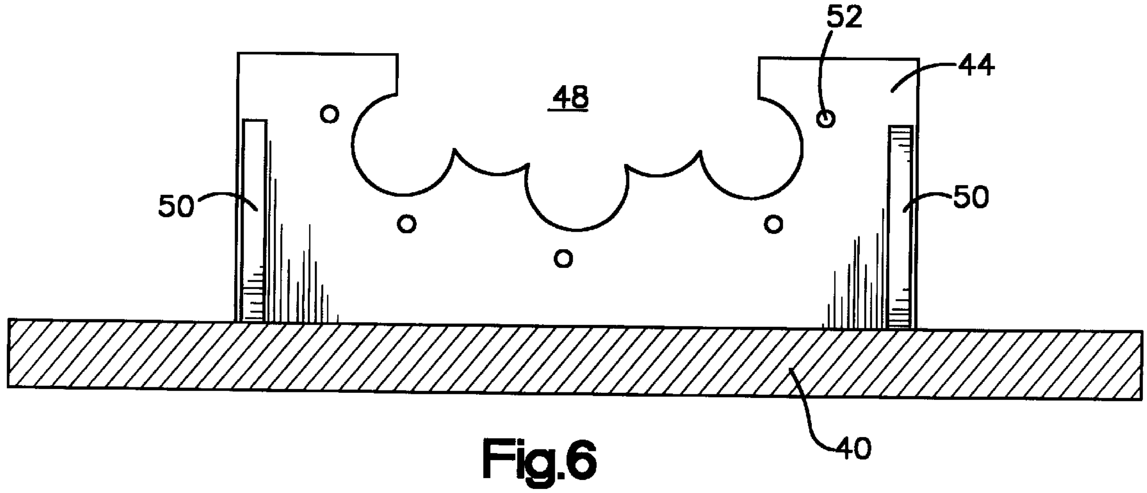
FIG. 6 is a cross-sectional view of the fixture as seen along line 6—6 in FIG. 3.

The locating member 44 is used to locate (position) the platform 16 of the tank 12 relative to the fixture 10 with mating locating elements, as described below. As shown in FIGS. 2, 4 and 6, the locating member 44 is oriented to lie generally parallel to the top side 20 of the platform 16. In the illustrated embodiment, the platform 16 is positioned against the locating member 44 which is interposed between the spaced apart support assemblies 42. The locating member 44 in the illustrated embodiment is a generally vertical plate mounted on the base 40. The locating member 44 is generally rectangular and includes a cut-away opening 48 which allows the sealing surfaces 34 around the access openings 24 in the platform 16 to be machined without removing the tank 12 from the fixture 10 or repositioning the tank 12 in the fixture 10. A plurality of braces 50 hold the locating member 44 in a fixed position relative to the base 40. The invention is not limited to the shape, location, and type of locating member illustrated herein. Likewise, the illustrated braces, or other types of braces which support the locating member, may be used or omitted for a particular design in a well known manner.

A plurality of locating elements, formed in the illustrated embodiment by a plurality of through-holes 52 in the locating member 44 and screws (not shown), position the platform 16 relative to the locating member 44 by mating with corresponding locating points formed by the holes 22 in the platform 16 to positively locate the tank 12 relative to the fixture 10. The locating elements may include pins or screws that extend through the through-holes 52 in the locating member 44 and the holes 22 in the platform 16. Alternatively, the locating elements may include positioning dowels which are received in the holes 22 in the platform 16 and/or the locating member 44. The positioning dowels may be integral to either the locating member 44 or the platform 16 for mating with corresponding holes in the other for positively positioning the platform and locating member relative to each other.

Figure 5:
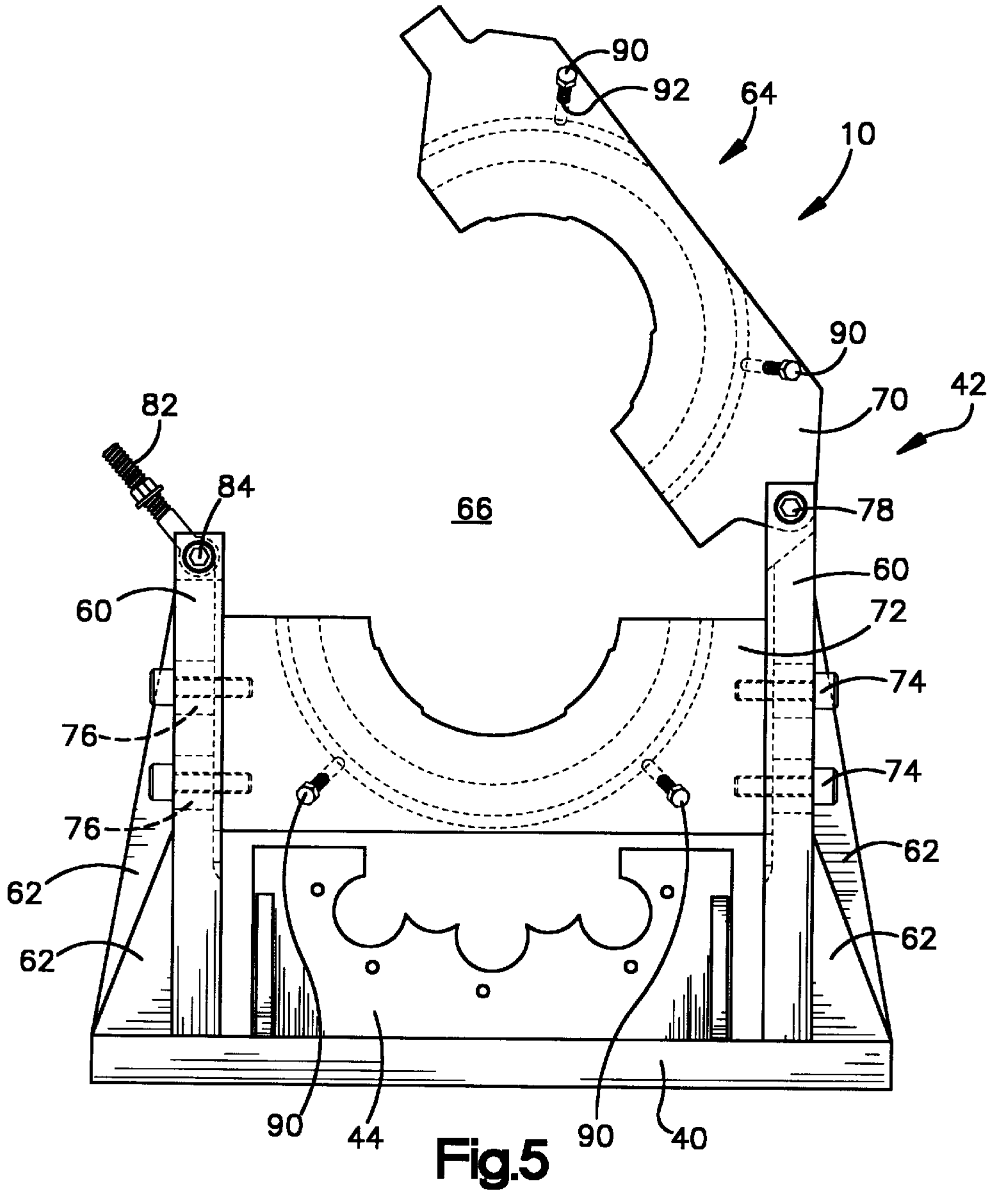
FIG. 5 is a front view of the fixture in an open condition to receive a tank or other workpiece.

Referring to FIGS. 3, 4 and 5, each support assembly 42 includes a pair of laterally spaced apart, upright posts 60 mounted to the base 40 and a plurality of laterally outwardly extending support braces 62 which brace the posts 60 relative to the base 40. Other types of support braces which support the posts, other than the illustrated support braces, may be used or omitted as is necessary for the particular design in a well known manner. For example, the braces may allow the posts to be adjusted toward and/or away from each other, and/or may allow the support assemblies to move toward and away from each other. Each support assembly 42 also includes a support member 64 which interconnects the posts 60. The illustrated support member 64 is substantially planar, with an opening 66 (FIG. 1) therethrough to provide access to an end of the tank 12 for a machining tool (not shown). The side of each support member 64 facing the locating member 44 has a beveled surface 68 (FIG. 1) formed around the opening 66. Alternatively the beveled surface may be concave or otherwise curved to accommodate an end of the tank 12 in close proximity therewith, or the entire support member 64 may have a shape adapted to accommodate an end of the tank 12 or other workpiece in close proximity therewith.

As is explained in further detail below, the support assembly 42 is movable to accomplish the close relationship between the beveled surface 68 of the support member 64 and an end of the tank 12. It is not necessary, however, for the end of the tank 12 to come into contact with the beveled surface 68. The support assemblies 42 cooperate to support the tank 12 in a substantially fixed position in the fixture 10 during the machining operation. In the illustrated embodiment, the screws (not shown) used as locating elements to position the tank 12 relative to the fixture 10 are adequate to support the tank 12 in a fixed position if only the sealing surfaces 34 around the access openings 24 in the platform 16 require a machining operation. Furthermore, if only one end of the tank 12 requires a machining operation, the support assembly 42 adjacent that end, in combination with the screws connecting the locating member 44 and the platform 16, is sufficient to support the tank 12 in a substantially fixed position for a machining operation. If the locating elements used to position the platform 16 relative to the locating member 44 do not hold the platform against the locating member, the fixture 10 should include at least one support assembly 42. The at least one support assembly 42 should be on the same side of the locating member 44 as the platform 16, and preferably includes a pair of support assemblies 42, one on either side of the locating member 44, as shown in the illustrated embodiment.

Each support member 64 in the illustrated embodiment is a mirror image of the other, thus the description of one support member 64 generally applies to both. However, it is not necessary for the support members 64 to be identical. The illustrated support member 64 is split into relatively movable upper and lower members 70 and 72, respectively, to facilitate loading and unloading the fixture 10 and to accommodate different size tanks 12. The upper member 70 and the lower member 72, together with the posts 60, frame the opening 66 in the support member 64.

In the illustrated embodiment, the lower member 72 is vertically adjustable. Adjustable vertical positioning bolts 74 pass through vertical slots 76 extending through the posts 60 to secure the lower member 72 to the posts 60. The adjustable positioning bolts 74 are loosened to move within the vertical slots 76 (see FIGS. 2 and 5) and are tightened to secure the lower member 72 in a variety of vertical positions for different size tanks or other workpieces.

The upper member 70 in the illustrated embodiment is movable between a closed position (FIG. 4 and the rear support member 64 in FIG. 1) for supporting the tank 12 and an open position (FIG. 5 and the near support member 64 in FIG. 1) to facilitate loading the tank 12 into and unloading the tank 12 from the fixture 10. The upper member 70 swings about a pivot, formed in the illustrated embodiment by a pivot bolt 78 that connects one side of the upper member 70 to one of the posts 60. The opposite end of the upper member 70 includes a notch 80 (FIG. 1) which engages a latch on the opposite post 60.

In the illustrated embodiment, the latch is formed by a lock-down eye bolt 82 which pivots about an eye bolt pivot formed by a bolt 84 that connects the eye of the eye bolt to the post 60. The lock-down eye bolt 82 has a nut 86 which may be tightened against the upper member 70 to secure it in the closed position. Although in the illustrated embodiment the upper member 70 swings open to expand the opening 66 in the support member 64, other types of upper member 70 which expand the opening 66 in the support member 64 also can be used. For example, the upper member may move in vertical slots in each of the posts, with a variety of vertical positions in which the movable plate may be secured. Alternatively, the entire support assembly 42 may be movable to facilitate loading and unloading the fixture 10. Regardless of the type of upper member that is used, each part of the support assembly 42 should be secured in a fixed position during machining operations.

The support assembly 42 also includes a plurality of circumferentially spaced apart support elements 90 which extend through holes 92 in the support member 64 and are arranged about the opening 66. The support elements 90 extend generally perpendicular to the beveled surface 68 of the support member 64 in the illustrated embodiment. The support elements 90 are independently adjustably movable into supporting engagement with the surface of the tank 12, as is shown, for example, in FIG. 4. The support elements 90 are radially and/or axially adjustable as needed. The independent adjustability of the support elements 90 allows the fixture to securely support irregular workpieces, such as the filament-wound tank 12, in the desired position, for example, with the centerline passing through the access openings 24 in the upper and the lower ends 26 and 28, respectively of the tank 12 centered in the access openings 24 in the support members 64. In a split support member 64, as shown in the illustrated embodiment, preferably at least one support element 90 extends through each of the upper member 70 and the lower member 72, with at least three support elements 90 in total. In the illustrated embodiment, the support elements 90 are four bolts that extend through respective threaded holes 92; however, other numbers and types of support elements may be used other than those illustrated. For example, the support elements may be hydraulically actuated pins that automatically extend through the holes in the support member to engage the surface of the tank, or the support elements may be spring-loaded screws. In addition, the support elements may include shoes on distal ends of the support elements that are adapted to engage the surface of the tank.

Referring to FIGS. 1, 2 and 4, the illustrated fixture 10 is used in the following manner. The support assemblies 42 are opened and a workpiece, such as the tank 12 described above, is loaded into the fixture 10. The tank 12 is located relative to the fixture 10 through locating elements interconnecting the platform 16 of the tank 12 to the locating member 44. The support assemblies 42 are closed and adjusted as needed to engage the surface of the tank 12 and to support the tank. The machining operation is performed, the support assemblies 42 are opened, and the tank 12 is unloaded from the fixture 10.

In the illustrated embodiment, the support assemblies 42 are opened by releasing the latches formed by the lock-down eye bolts 82 by loosening the nuts 86 and moving the eye bolts out of the notches 80 in the upper members 70 of the support members 64. The upper members 70 are moved from the closed position to the open position, and the tank 12 or other workpiece is placed in the fixture 10. The tank 12 is positioned relative to the fixture 10 by connecting the platform 16 to the locating member 44 with screws (not shown) that extend through the through-holes 52 in the locating member 44 and tightly engage the corresponding holes 22 in the top side 20 of the platform 16 to positively locate the tank 12 relative to the fixture 10. The upper members 70 are moved to the closed position and secured in place by the nuts 86 and lock-down eye bolts 82 that form the latches. The lower members 72 are adjusted vertically as needed for different size tanks, and are secured in place with the vertical positioning bolts 74. The support elements 90 are independently adjusted as needed to engage the surface of the tank 12. The support assemblies 42 cooperate to hold the tank 12 in position relative to the fixture 10 for machining operations. The fixture 10 as a whole is positioned in the usual manner relative to the machining tool (not shown). The process is reversed to unload the fixture 10.

In the fixture 10 according to the invention, the sealing surfaces 34 on the upper end 26, the lower end 28 and the platform 16 are machined without repositioning the tank 12 in the fixture 10, resetting the position of the fixture 10 relative to the machining tool, or otherwise interrupting the machining operation. The machining tool can machine the sealing surfaces 34 on the upper end 26 and the lower end 28 through the openings 66 in the support members 64, and can machine the sealing surfaces 34 around the access openings 24 in the top side 20 of the platform 16 through the cut-away 48 in the locating member 44, thereby machining the tank 12 near the places where the tank 12 is supported to minimize deflection of the tank 12 in reaction to the machining tool.

In addition, locating the top side 20 of the platform 16 relative to the fixture 10 permits the sealing surfaces 34 on the upper end 26, the lower end 28 and the platform 16 to be machined such that close tolerances can be maintained on dimensions between these surfaces without removing or repositioning the tank 12 in the fixture 10. For example, the sealing surfaces 34 on the upper end 26, the lower end 28 and the platform 16 can be machined to parallel while at the same time controlling the overall height of the tank 12. The locating member 44 and locating elements provide a way to positively position the workpiece relative to the fixture 10, thereby permitting a precision machining tool to perform precision machining operations to maintain tolerances on relative dimensions between multiple surfaces on the workpiece without moving the workpiece in the fixture. Thus, the fixture and method according to the present invention reduce set-up time and maximize the operating time of the machining tool. Furthermore, the fixture can be quickly and easily unloaded, reloaded and adjusted, thereby further reducing set-up time and maximizing the utilization of the machining tool.

In an alternative embodiment of the invention (not shown) the fixture locates and supports a tank which lacks a platform or shelf. This type of tank may have one or more access openings and locating points on a side of the tank, and may otherwise be substantially similar to the tank described above.

The fixture in this alternative embodiment is substantially similar to the fixture described above, the fixture having a pair of support assemblies and a locating member mounted to a base. The locating elements in the locating member are oriented to positively locate the tank in the fixture relative to corresponding locating points in the side of the tank. Thus the fixture of this alternative embodiment positively locates and supports the tank to permit sealing surfaces to be machined that are generally parallel or flush with the surface of the tank. In contrast to the previously described embodiment, however, the locating member is oriented to lie generally parallel to the surface of the tank in the vicinity of the locating points, and thus generally is not in a plane which is parallel to the planes of the support assemblies. In this embodiment, the locating member may have a curving shape generally corresponding to the curvature of the side of the tank, or alternatively, the locating member may have the shape of a flat plate. To permit access to the sealing surfaces around the access openings, the locating member may be mounted in an elevated position generally parallel to the base, or mounted to extend to a side of the fixture generally parallel to a side of the tank which does not face the base of the fixture. Furthermore, the locating member may be selectively adjustable to a plurality of fixed positions to locate different size or different types of tanks and/or to facilitate loading tanks into the fixture.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A fixture for locating and supporting a workpiece having an irregular shape or an irregular surface, comprising:

a base;

a locating member which positions the workpiece relative to the base, the locating member connected to the base; and at least one support assembly connected to the base, the support assembly including a plurality of independently adjustable support elements which are selectively adjusted to engage the surface of the workpiece to facilitate supporting the workpiece, wherein the at least one support assembly includes a pair of spaced apart posts and a support member interconnecting the posts, the support member including an opening, the support elements being arranged around the opening.

2. The fixture of claim 1, wherein the support member is movable to facilitate loading and unloading the fixture.

3. The fixture of claim 2, wherein the support member includes a lower member and an upper member which moves between an open position to facilitate loading and unloading the fixture and a closed position whereat the upper member is selectively secured in position.

4. The fixture of claim 2, wherein the lower member is adjustable relative to the base to accommodate different size workpieces.

5. The fixture of claim 1, wherein the support elements have threads which engage threads in holes in the support member to axially adjust the position of the support elements.

6. The fixture of claim 5, wherein the support elements are bolts.

7. The fixture of claim 3, wherein at least one of the support elements is mounted to the upper member and at least one of the support elements is mounted to the lower member, with at least three support elements total.

8. The fixture of claim 1, wherein the fixture includes a pair of spaced apart support assemblies.

9. The fixture of claim 8, wherein the locating member is interposed between the pair of support assemblies.

10. The fixture of claim 1, wherein the support member has a recessed surface and the support elements extend substantially perpendicular to the recessed surface.

11. The fixture of claim 1, further comprising a plurality of locating elements which interconnect the locating member and the workpiece.

12. A fixture for locating and supporting a workpiece having an irregular shape or an irregular surface, comprising:

a base;

a locating member mounted to the base for locating the workpiece relative to the base;

a plurality of locating elements connected to the base to position the workpiece relative to the base; and a pair of support assemblies mounted to the base and spaced apart on either side of the locating member, each support assembly including a pair of laterally spaced apart posts interconnected by a support member, the support member having an opening and a plurality of support elements arranged around the opening that are selectively independently axially adjustable to engage the surface of the workpiece; wherein the support assemblies cooperate to support the workpiece therebetween.

13. The fixture of claim 12, wherein the locating member is substantially rectangular with an opening adjacent which the locating elements are arranged.

14. The fixture of claim 12, wherein the support member includes a lower member and an upper member which may be moved between an open position to facilitate loading and unloading the fixture and a closed position whereat the upper member is selectively secured in position relative to the lower member.

15. The fixture of claim 14, wherein the lower member is vertically adjustable relative to the base to accommodate different size workpieces.

16. The fixture of claim 12, wherein the support elements have threads which engage threads in holes in the support member to axially adjust the position of the support elements relative to the support member.

17. The fixture of claim 16, wherein the support elements are bolts.

18. The fixture of claim 12, wherein the support assemblies and the locating member are in substantially parallel planes which are substantially perpendicular to the base.

* * * * *